(12) United States Patent
Min

(10) Patent No.: US 8,231,103 B2
(45) Date of Patent: Jul. 31, 2012

(54) FLOW CONTROL VALVE

(75) Inventor: Tae-Sik Min, Seoul (KR)

(73) Assignee: Kyungdong Navien Co. (KR)

( * ) Notice: Subject to any disclaimer, the term of this patent is extended or adjusted under 35 U.S.C. 154(b) by 404 days.

(21) Appl. No.: 12/523,727

(22) PCT Filed: Jan. 16, 2008

(86) PCT No.: PCT/KR2008/000260
§ 371 (c)(1),
(2), (4) Date: Jul. 18, 2009

(87) PCT Pub. No.: WO2008/088166
PCT Pub. Date: Jul. 24, 2008

(65) Prior Publication Data
US 2010/0096573 A1    Apr. 22, 2010

(30) Foreign Application Priority Data
Jan. 19, 2007  (KR) .................. 10-2007-0006244

(51) Int. Cl.
*F16K 31/02* (2006.01)
(52) U.S. Cl. .............. 251/129.11; 251/248; 310/78; 310/83
(58) Field of Classification Search .......... 251/129.11–129.13, 248; 310/78, 83, 101, 112
See application file for complete search history.

(56) References Cited

U.S. PATENT DOCUMENTS

| 3,258,985 | A | * | 7/1966 | Jordan | 251/129.12 |
| 3,434,025 | A | * | 3/1969 | Kennedy et al. | 318/8 |
| 4,800,308 | A | | 1/1989 | Tice | |
| 5,131,510 | A | * | 7/1992 | Jamrus et al. | 188/171 |
| 5,568,911 | A | * | 10/1996 | Kim | 251/129.12 |
| 6,534,793 | B1 | * | 3/2003 | Heritier-Best | 251/129.11 |
| 7,607,638 | B2 | * | 10/2009 | Wilson et al. | 251/129.11 |

FOREIGN PATENT DOCUMENTS

| JP | S57-040184 | 3/1982 |
| JP | S61-193269 | 12/1986 |
| JP | H04-232894 | 8/1992 |

(Continued)

OTHER PUBLICATIONS

International Search Report PCT/KR2008/000260 in Apr. 30, 2008.

(Continued)

*Primary Examiner* — Eric Keasel
(74) *Attorney, Agent, or Firm* — Hershkovitz & Associates, LLC

(57) ABSTRACT

A flow control valve controls the flow rate of heated water supplied from a boiler. The valve can normally/reversely turn and control the flow rate in a pipeline using first and second one-way motors, and stops power for one motor when the other motor is rotated. The valve includes a motor assembly including the first and second motors that have power transmission shafts which rotate in opposite directions, a gear assembly including first and second planetary gears that receive power from the motors and a sun gear disposed between and engaged with the planetary gears, a clutch structure between the first planetary gear and motor, and the second planetary gear and motor, that transmits or stops power, and a valve actuator including a shaft that reciprocates up/down by rotation of the sun gear and a valve unit fitted on the lower portion of the shaft that opens/closes the valve.

8 Claims, 4 Drawing Sheets

| | FOREIGN PATENT DOCUMENTS | |
|---|---|---|
| JP | H05-079151 | 10/1993 |
| JP | 06-296346 A | 10/1994 |
| JP | H07-038844 | 7/1995 |
| JP | H10-205639 | 8/1998 |
| KR | 20-0247276 Y1 | 10/2001 |
| KR | 20-0350996 Y1 | 5/2004 |
| KR | 20-0432718 Y1 | 12/2006 |

OTHER PUBLICATIONS

English language Abstract of JP 06-296346.
English Language Abstract of JP H04-232894.
English Language Abstract of JP H10-205639.
Japanese Office Action mailed Feb. 21, 2012.

* cited by examiner

[Fig. 1]
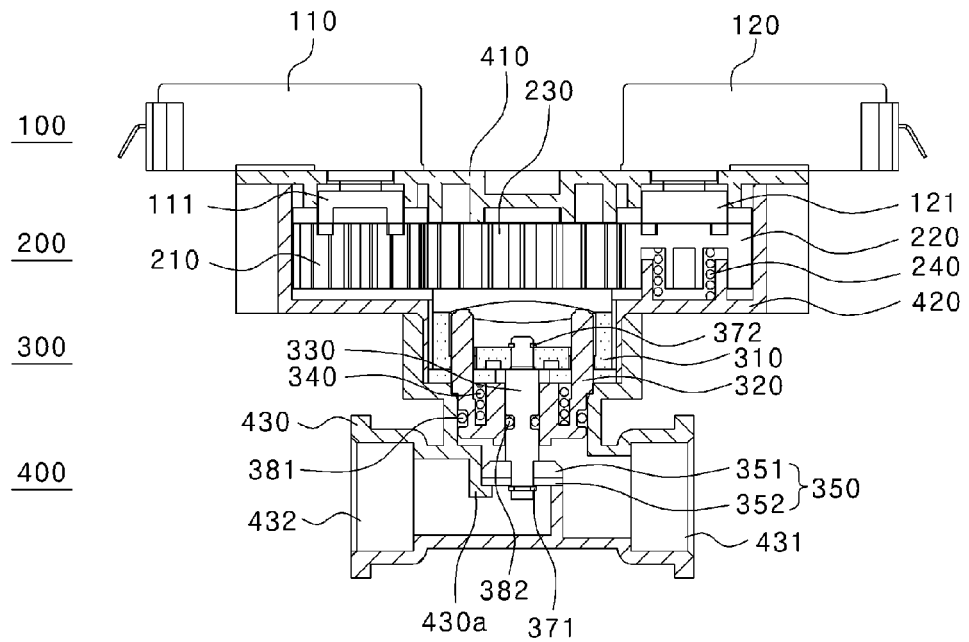
[Fig. 2]
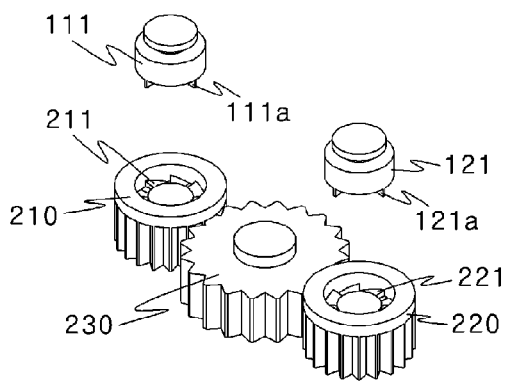
[Fig. 3]
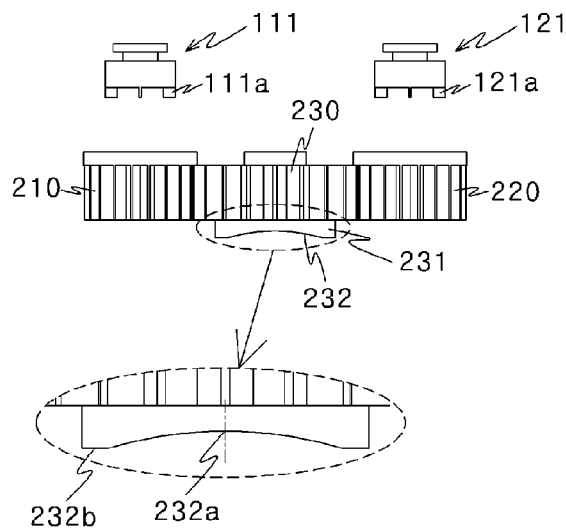

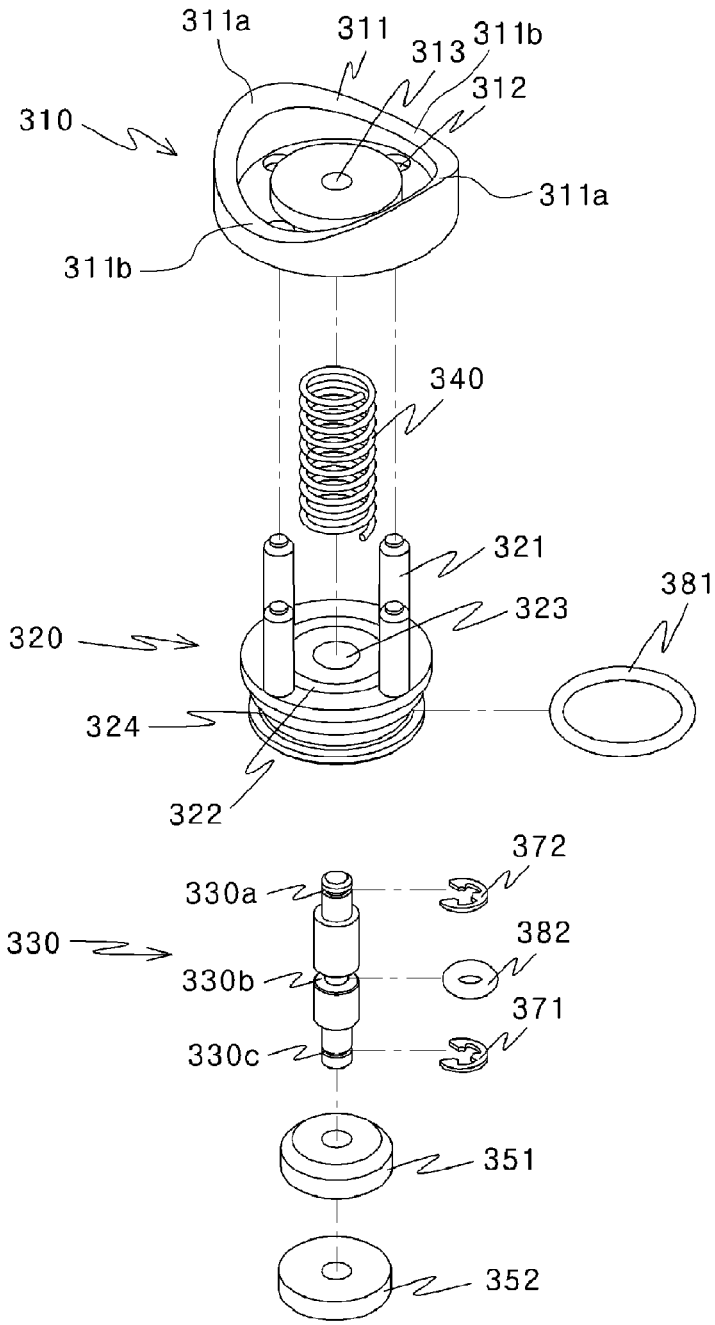
[Fig. 4]
[Fig. 5]
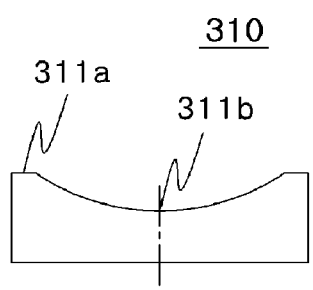

[Fig. 6]
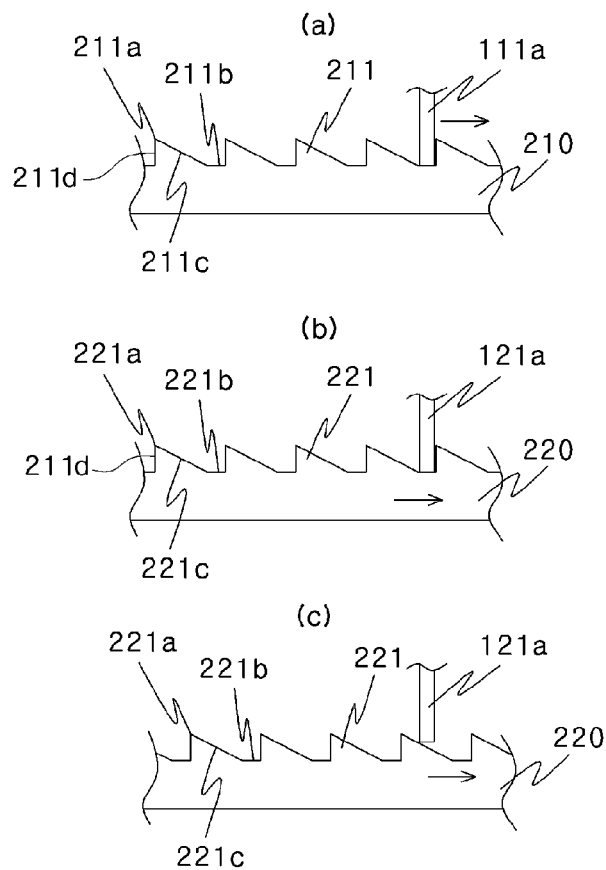
[Fig. 7]
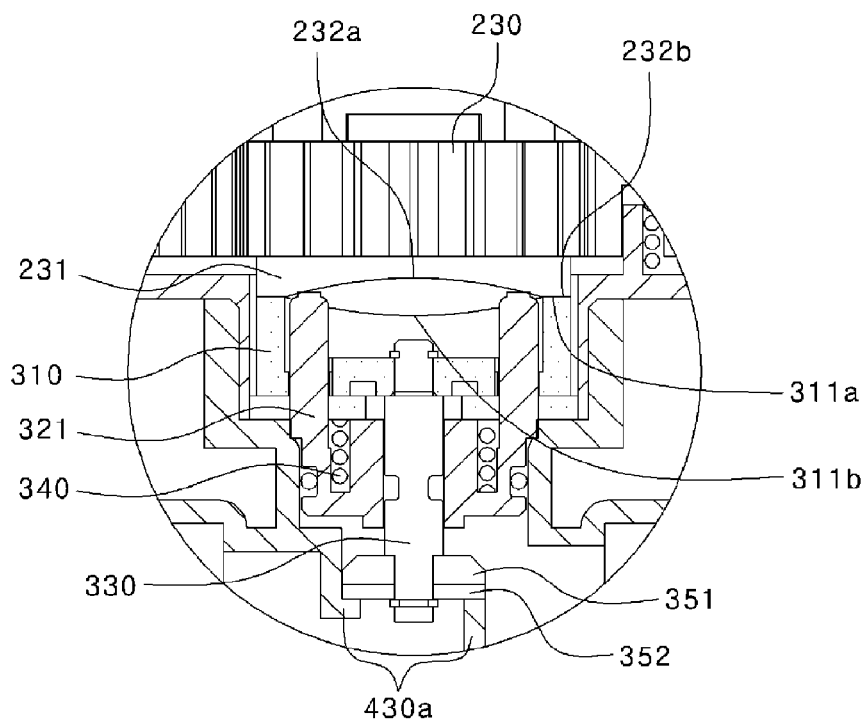

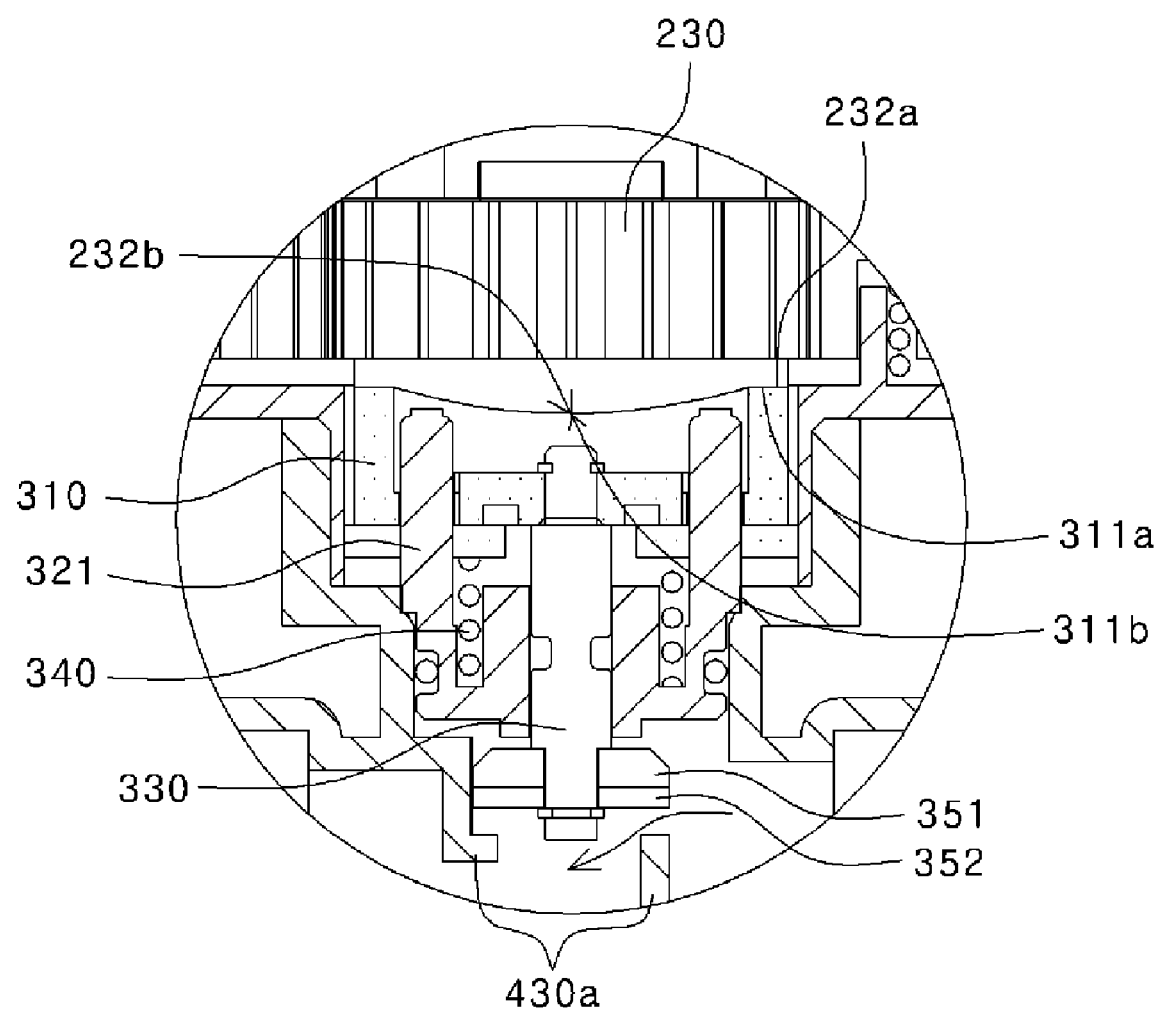
[Fig. 8]

FLOW CONTROL VALVE

CROSS-REFERENCE TO RELATED APPLICATIONS

This is a US National Stage Patent Application under 35 USC §371 of International Application No. PCT/KR2008/000260 filed Jan. 16, 2008, and claims priority of KR10-2007-0006244 filed Jan. 19, 2007.

BACKGROUND OF THE INVENTION

1. Technical Field

The present invention relates to a flow control valve, particularly a flow control valve that controls the flow rate of heated water that is supplied from a boiler, in a pipe line through which the heated water flows.

2. Background Art

In general, a boiler system is equipped with a water distributor that distributes heated water to each room that needs to be heated. The water distributor receives water heated by a heat exchanger of the boiler through a water supply pipe and then distributes the heated water to each room, and the heated water is cooled by transferring heat energy to the rooms and then delivered to an expansion tank through a return pipe. The water distributor is equipped with a flow control valve to control the flow rate of the heated water that is supplied to each room.

It is not economical to use a two-way motor, which can rotate normally and reversely, for the flow control valve to open/close a channel, because the two-way motor is expensive.

SUMMARY OF THE INVENTION

According to a first aspect of the invention, there is provided a flow control valve that can normally/reversely turn and control the flow rate using two low-price, one-way motors. Further, according to another object of the invention, there is provided a flow control valve that can stop power for one of the two one-way motors while the other one-way motor rotates by applying a simple clutch structure to a gear assembly connected with the two one-way motors.

According to an aspect of one or more embodiments of the present invention, a flow control valve includes: a motor assembly including a first motor that has a first power transmission shaft and rotates in one direction and a second motor that has a second power transmission shaft and rotates in the opposite direction of the first motor; a gear assembly including a first planetary gear that receives power from the first motor, a second planetary gear that receives power from the second motor, and a sun gear that is disposed between the first planetary gear and the second planetary gear and engaged with the first and second planetary gears, and having a clutch structure between the first planetary gear and the first motor, and the second planetary gear and the second motor to transmit or stop power; and a valve actuator including a shaft that reciprocates up/down by rotation of the sun gear and a valve unit that is fitted on the lower portion of the shaft and opens/closes the valve.

A plurality of locking portions may protrude from the power transmission shaft of the first motor and the power transmission shaft of the second motor, respectively. Further, the power may be transmitted or stopped by engaging or disengaging the locking portions of the first and second power transmission shafts and continuous saw tooth-shaped protrusions formed on the upper sides of the first planetary gear and the second planetary gear, in the clutch structure of the gear assembly.

Elastic members may be disposed under the first planetary gear and the second planetary gear to elastically return the first planetary gear and the second planetary gear when the plurality of locking portions slip upward onto the protrusions.

A cam may be formed on the lower side of the sun gear. Further, the valve actuator may include a lower cam member that is in contact with the cam of the sun gear and reciprocates up/down by rotation of the sun gear, and an elastic member that elastically supports the lower side of the lower cam member.

The lower cam member may be guided by a guide member that protrudes upward inside the lower cam member, reciprocating with rotation of the sun gear.

As described above in detail, according to a flow control valve of an embodiment of the invention, since one-way motors are used and the clutch structure is provided, it is possible to achieve a simple-structured valve and reduce the price of the valve, compared to using a two-way motor. Further, since the contact surfaces of the sun gear and the lower cam member are formed in a cam shape, it is possible to control the flow rate by controlling the opening amount of the valve.

BRIEF DESCRIPTION OF THE DRAWINGS

FIG. 1 is a side cross-sectional view of a flow control valve according to an embodiment of the invention;

FIG. 2 is a perspective view showing a gear assembly and a clutch member according to an embodiment of the invention;

FIG. 3 is a side view of FIG. 2;

FIG. 4 is an exploded perspective view showing a valve actuator according to an embodiment of the invention;

FIG. 5 is a side view showing a lower cam member of FIG. 4;

FIGS. 6A to 6C are views illustrating the operation of planetary gears and locking portions of power transmission shafts according to an embodiment of the invention; and FIGS. 7 and 8 are views illustrating that a valve is opened or closed according to an embodiment of the invention.

DESCRIPTION OF THE PREFERRED EMBODIMENTS

The configuration and operation according to preferred embodiments of the invention is described hereafter in detail with reference to the accompanying drawings.

FIG. 1 is a side cross-sectional view of a flow control valve according to an embodiment of the invention, FIG. 2 is a perspective view showing a gear assembly and a clutch member according to an embodiment of the invention, FIG. 3 is a side view of FIG. 2, FIG. 4 is an exploded perspective view showing a valve actuator according to an embodiment of the invention, and FIG. 5 is a side view showing a lower cam member of FIG. 4.

Referring to FIGS. 1-5, a motor assembly 100 is comprised of a first motor 110 that rotates in one direction and a second motor 120 that is disposed opposite to the first motor 110 and rotates in the opposite direction of the first motor 110. A low-price AC motor, for example, may be used for the first motor 110 and second motor 120. Power transmission shafts 111, 121 protrude down from the first motor 110 and the second motor 120, respectively, to transmit power from the motors to a gear assembly 200.

A plurality of locking portions 111a, 121a protrude from the lower sides of the power transmission shafts 111, 121 and are locked to the top sides of a first planetary gear 210 and a second planetary gear 220 for an operation of a clutch including the plurality of locking portions 111a, 121a and saw tooth-shaped continuous protrusions 211, 221, as further described below.

The gear assembly 200 is comprised of the first planetary gear 210 connected with the power transmission shaft 111 of the first motor 110 for power transmission, the second planetary gear 220 connected with the power transmission shaft 121 of the second motor 120 for power transmission, and a sun gear 230 located between and engaged with the first planetary gear 210 and the second planetary gear 220 to transmit rotational force of the motors to a valve actuator 300.

The saw tooth-shaped continuous protrusions 211, 221 are formed on the top sides of the first planetary gear 210 and the second planetary gear 220 to engage or disengage the locking portions 111a, 121a of the power transmission shafts 111, 121 for the operation of the clutch.

Apexes 211a, 221a are formed at the top of the protrusions 211, 221 and bottoms 211b, 221b are formed at the lower side. The bottoms 211b, 221b have a predetermined width to seat the locking portions 111a, 121a.

Slopes 211c, 221c having a predetermined angle are formed between the apexes 211a, 221a and the bottoms 211b, 221b and power that is received from the first and second motors 110, 120 is stopped by disengaging the locking portions 111a, 121a of the power transmission shafts 111, 121 when the first and second planetary gears 210, 220 are in rotation.

Further, vertical surfaces 211d, 221d are positioned opposite to the slopes 211c, 221c and lock the locking portions 111a, 121a when the first and second motors 110, 120 rotate, such that power is transmitted to the first planetary gear 210 and the second planetary gear 220.

The lower sides of the first planetary gear 210 and the second planetary gear 220 are elastically supported by elastic members 240, such as a spring.

The valve actuator 300 includes a shaft 330 reciprocating up/down by rotation of the sun gear 230 and a valve unit 350 fitted on the lower portion of the shaft 330 to open/close the valve.

A variety of structures are available to reciprocate the shaft 330 with rotation of the sun gear 230, but according to this embodiment, the shaft 330 is reciprocated by the cam motion of a cam 231 formed on the lower side of the sun gear 230 and a lower cam member 310 of the valve actuator 300.

In detail, the cam 231 protrudes in a predetermined length from the lower side of the sun gear 230, and a cam contact surface 232 that is curved in a cam shape is formed along the circumference on the lower side of the cam 231. The cam contact surface 232 has two top dead points 232a, which are the uppermost points of an arc-shaped surface, and two bottom dead points 232b, which are the lowermost points from the top dead points 232a.

Further, a lower cam contact surface 311 is formed on the top side of the lower cam member 310, taking the shape of the cam contact surface 232 of the cam 231. The lower cam contact surface 311 has two top dead points 311a that are the uppermost points of an arc-shaped surface that is concave upward, and two bottom dead points 311b that are the lowermost points from the top dead points 311a.

Therefore, the lower cam member 310 reciprocates up/down with rotation of the sun gear 230 by the above cam shape.

In the lower cam member 310, four guide shaft insert holes 312 are formed at predetermined distances along the edge, and a shaft insert hole 313 is formed at the center. Further, the lower side of the lower cam member 310 is elastically supported by an elastic member 340, such as a spring. According to the above configuration, the elastic member 340 applies elastic force upward to the lower side of the lower cam member 310, such that it provides elastic return force, when the lower cam member 340, which has moved down, moves up.

It is preferable for the lower cam member 310 reciprocating up/down to be guided by a guide member 320. The guide member 320 has four guide shafts 321 that are inserted in the guide shaft insert holes 312 of the lower cam member 310, a circular elastic member insert groove 322 where the elastic member 340 is inserted, the elastic member 340 being located inside from the guide shafts 321, and a shaft-through hole 323 where the shaft 330 is inserted, the shaft-through hole 323 being located inside the elastic member insert groove 322. Further, an O-ring insert groove 324 where an O-ring 381 is fitted is positioned on the circumference of the guide member 320 for airtight sealing.

The shaft 330 has E-ring insert grooves 330a, 330c at the upper and lower end portions, respectively, to insert E-rings 371, 372, and an O-ring insert groove 330b at the middle portion to insert an O-ring 382 for airtight sealing.

Fitted on the lower portion of the shaft 330, the valve unit 350 includes a packing support member 351 made of synthetic resin and a packing 352 that opens/closes the valve by contacting/separating with/from a valve seat 430a. Rubber is preferably used for the packing 352.

A body assembly 400 is disposed at the most outside in this embodiment. The body assembly 400 is composed of an upper cover 410 covering the upper side of the sun gear 230, a gear-sided body 420 covering the sides of the first and second planetary gears 210, 220, and a valve-sided body 430 covering the circumference of the valve actuator 300. The valve-sided body 430 has an inlet 431 for the inflow of heated water and an outlet 432 for the outflow of the heated water passing through the valve unit 350.

The operation of the flow control valve having the above configuration, such as a clutch, according to an embodiment of the invention is described hereafter. For the sake of convenience of description, it is assumed that the rotational direction of the first motor 110 is in the normal direction and the rotational direction of the second motor 120 is in the reverse direction.

FIGS. 6A to 6C are views illustrating the operation of planetary gears and locking portions of power transmission shafts according to an embodiment of the invention. As shown in FIG. 6A, as the first motor 110 rotates in the normal direction, the locking portions 111a of the power transmission shaft 111 are locked to the protrusions 211 of the first planetary gear 210 while rotating in the direction of an arrow, such that the first planetary gear 210 rotates in the same direction and power is transmitted to the sun gear 230.

The power transmitted to the sun gear 230 is transmitted to the second planetary gear 220 engaged with the sun gear 230. As shown in FIGS. 6B and 6C, the second planetary gear 220 rotates in the direction of the arrow, but the locking portions 121a of the power transmission shaft 121 that are in contact with the bottoms 221b slip on the slope 221c toward the apexes 221a. As a result, the power is not transmitted to the second motor 120 due to this operation, such as a clutch. The second planetary gear 220 that has been moved downward due to the slip of the locking portions 121a is returned by the elastic member 240 supporting the lower side.

Further, when the first motor 110 is stopped and the second motor 120 rotates in the reverse direction, the second planetary gear 210, sun gear 230, and first planetary gear 210 are rotated by transmitted power; however, when the first planetary gear 210 is in rotation, the locking portions 111a of the power transmission shaft 111 slip upward on the slope 211c of the protrusions 211 of the first planetary gear 210. As a result, power is transmitted to the first motor 110 by this operation, such as a clutch.

FIGS. 7 and 8 are views illustrating that a valve opens and closes according to an embodiment of the invention.

FIG. 7 shows the valve closed. In detail, the bottom dead points 232b are positioned at both sides of the sun gear 230 and the top dead points 311a of the lower cam member 310 are in contact with the bottom dead points 232b of the sun gear 230. Therefore, the lower cam member 310 is pushed down by the bottom dead points 232b of the sun gear 230, such that the shaft 330 and the valve unit 350 are moved down, causing the packing 352 to contact with the valve seat 430a and closing the valve, in which the top dead points 232a of the sun gear 230 and the bottom dead points 311b of the lower cam member 310 are spaced apart.

FIG. 8 shows the valve open. In detail, as shown in FIG. 7, with the valve closed, when the first motor 110 or the second motor 120 is in rotation, the bottom dead points 232b of the sun gear 230 and the bottom dead points 311b of the lower cam member 310, and the top dead points 232a of the sun gear 230 and the top dead points 311da of the lower cam member 310 are in contact with each other, respectively. Therefore, as the lower cam member 310 is pushed up by the elastic force of the elastic member 340, the shaft 330 and the valve unit 350 are moved up and the packing 352 is separated from the valve seat 430a, such that the valve is opened.

The valve is completely (100%) closed in FIG. 7 and completely open (100%) in FIG. 8, but it is possible to control the flow rate by controlling the number of rotations of the first motor 110 and the second motor 120 to control the opening amount of the valve.

Further, since the first motor 110 and the second motor 120 rotate in the opposite directions, it is possible to control the valve with a desired flow rate. That is, if only one of the first motor 110 and the second motor 120 is provided, it is required to rotate the motor such that the valve shifts from opening 50% to 100% then opening 20% in order to shift the valve from opening 50% to 20%; therefore, the response speed of the valve is decreased. However, since two motors are provided in this embodiment of the invention, it is possible to rapidly shift the valve to have a 20% opening by rotating the other motor in the reverse direction when the valve is at 50% open.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A flow control valve comprising:
  a motor assembly including a first motor that has a first power transmission shaft and rotates in one direction and a second motor that has a second power transmission shaft and rotates in the opposite direction of the first motor;
  a gear assembly including a first planetary gear configured to receive power from the first motor, a second planetary gear configured to receive power from the second motor, a sun gear that is disposed between the first planetary gear and the second planetary gear and engaged with the first and second planetary gears, a first clutch structure located between the first planetary gear and the first motor, and a second clutch structure located between the second planetary gear and the second motor, wherein the first and second clutch structures are configured to transmit or stop power;
  a valve actuator including a moving shaft that reciprocates up and down by a rotation of the sun gear, and a valve unit that is fitted on a lower portion of the moving shaft;
  wherein the first clutch structure comprises:
    a first plurality of locking portions protruding from the first power transmission shaft;
    a first plurality of continuous saw tooth-shaped protrusions positioned on an upper side of the first planetary gear; and
    a first plurality of bottoms, formed on a lower side of the first plurality of continuous saw tooth-shaped protrusions, between the first plurality of continuous saw tooth-shaped protrusions;
  wherein the second clutch structure comprises:
    a second plurality of locking portions protruding from the second power transmission shaft;
    a second plurality of continuous saw tooth-shaped protrusions positioned on an upper side of the second planetary gear; and
    a second plurality of bottoms, formed on a lower side of the second plurality of continuous saw tooth-shaped protrusions, between the second plurality of continuous saw tooth-shaped protrusions;
  wherein the first plurality of continuous saw tooth-shaped protrusions and the second plurality of continuous saw tooth-shaped protrusions include a slope that is formed between an apex of a top of each protrusion and each bottom;
  wherein the first and second clutch structures are configured such that power is transmitted when each locking portion is located on the bottom, and power is blocked when each locking portion is located on the slope.

2. The flow control valve according to claim 1, wherein the power is transmitted or stopped by engaging or disengaging the first and second plurality of locking portions and the first and second plurality of continuous saw tooth-shaped protrusions, respectively.

3. The flow control valve according to claim 2, further comprising a first and a second elastic members disposed under the first planetary gear and the second planetary gear and configured to elastically return the first planetary gear and the second planetary gear, respectively, when at least one of the first and second plurality of locking portions slip upward on the protrusions.

4. The flow control valve according to claim 1, further comprising a body assembly connected to the valve actuator, wherein the body assembly comprises:
  an upper cover configured to cover an upper side of the sun gear;
  a gear-sided body configured to cover the first and second planetary gears; and
  a valve-sided body configured to cover the circumference of the valve actuator, the valve-sided body including an inlet configured for an inflow of heated water and an outlet configured for an outflow of the heated water passing through the valve unit.

5. A flow control valve comprising:
  a motor assembly including a first motor that has a first power transmission shaft and rotates in one direction and a second motor that has a second power transmission shaft and rotates in the opposite direction of the first motor;

a gear assembly including a first planetary gear configured to receive power from the first motor, a second planetary configured to receive power from the second motor, a sun gear that is disposed between the first planetary gear and the second planetary gear and engaged with the first and second planetary gears, a first clutch structure located between the first planetary gear and the first motor, and a second clutch structure located between the second planetary gear and the second motor, wherein the first and second clutch structures are configured to transmit or stop power;

a valve actuator including a moving shaft that reciprocates up and down by a rotation of the sun gear, and a valve unit that is fitted on a lower portion of the moving shaft;

wherein the first clutch structure comprises:
  a first plurality of locking portions protruding from the first power transmission shaft; and
  a first plurality of continuous saw tooth-shaped protrusions positioned on an upper side of the first planetary gear;

wherein the second clutch structure comprises:
  a second plurality of locking portions protruding from the second power transmission shaft; and
  a second plurality of continuous saw tooth-shaped protrusions positioned on an upper side of the second planetary gear;

first and second elastic members disposed under the first planetary gear and the second planetary gear and configured to elastically return the first planetary gear and the second planetary gear, respectively, when at least one of the first and second plurality of locking portions slips upwardly on the protrusions;

a cam configured to from a lower side of the sun gear, the cam having a cam-shaped cam contact surface positioned on a lower side of the cam, wherein the valve actuator includes:
  a lower cam member having a lower cam contact surface that is in contact with the cam-shaped cam contact surface, the lower cam member being configured to reciprocate up and down by the rotation of the sun gear; and
  a third elastic member configured to elastically support a lower side of the lower cam member;

wherein the power is transmitted or stopped by engaging or disengaging the first and second plurality of locking portions and the first and second plurality of continuous saw tooth-shaped protrusions, respectively.

6. The flow control valve according to claim 5, wherein the lower cam member is guided by a guide member that protrudes upward inside the lower cam member, the guide member reciprocating with the rotation of the sun gear.

7. The flow control valve according to claim 6, wherein the guide member comprises:
  at least one guide shaft being inserted in at least one guide shaft insert hole of the lower cam member;
  a circular groove receiving the elastic member;
  a shaft-through hole where the moving shaft is inserted; and
  an O-ring insert groove receiving an O-ring configured for airtight sealing.

8. A flow control valve comprising:
a motor assembly including a first motor that has a first power transmission shaft and rotates in one direction and a second motor that has a second power transmission shaft and rotates in an opposite direction of the first motor;

a gear assembly including a first planetary gear configured to receive power from the first motor, a second planetary gear configured to receive power from the second motor, a sun gear that is disposed between the first planetary gear and the second planetary gear and engaged with the first and second planetary gears, a first clutch structure located between the first planetary gear and the first motor, and a second clutch structure located between the second planetary gear and the second motor, wherein the first and second clutch structures are configured to transmit or stop power; and a valve actuator including a moving shaft that reciprocates up and down by a rotation of the sun gear and a valve unit that is fitted on a lower portion of the moving shaft;

a first and a second elastic members disposed under the first planetary gear and the second planetary gear and configured to elastically return the first planetary gear and the second planetary gear, respectively;

a cam protruding from a lower side of the sun gear, the cam having a cam-shaped cam contact surface positioned on a lower side of the cam;

a body assembly connected to the valve actuator; and a guide member configured to guide a lower cam member, the guide member protruding upward inside the lower cam member, and the guide member reciprocating with the rotation of the sun gear;

wherein the first clutch structure comprises:
  a first plurality of locking portions protruding from the first power transmission shaft; and
  a first plurality of continuous saw tooth-shaped protrusions positioned on an upper side of the first planetary gear, wherein the second clutch structure comprises:
  a second plurality of locking portions protruding from the second power transmission shaft; and
  a second plurality of continuous saw tooth-shaped protrusions positioned on an upper side of the second planetary gear, wherein the power is transmitted or stopped by engaging or disengaging the first and second plurality of locking portions and the first and second plurality of continuous saw tooth-shaped protrusions, respectively, wherein the valve actuator includes:
  a lower cam member having a lower cam contact surface that is in contact with the cam-shaped cam contact surface, the lower cam member being configured to reciprocate up and down by the rotation of the sun gear; and
  a third elastic member elastically supporting a lower side of the lower cam member, wherein the guide member comprises:
  four guide shafts being inserted in four guide shaft insert holes of the lower cam member;
  a circular groove receiving the third elastic member;
  a shaft-through hole where a moving shaft is inserted; and
  an O-ring insert groove receiving an O-ring configured for airtight sealing, and wherein the body assembly comprises:
  an upper cover configured to cover an upper side of the sun gear;
  a gear-sided body configured to cover the first and second planetary gears; and
  a valve-sided body configured to cover the circumference of the valve actuator, the valve-sided body including an inlet configured for inflow of heated water and an outlet configured for outflow of the heated water passing through the valve unit.

* * * * *